Figure 1:
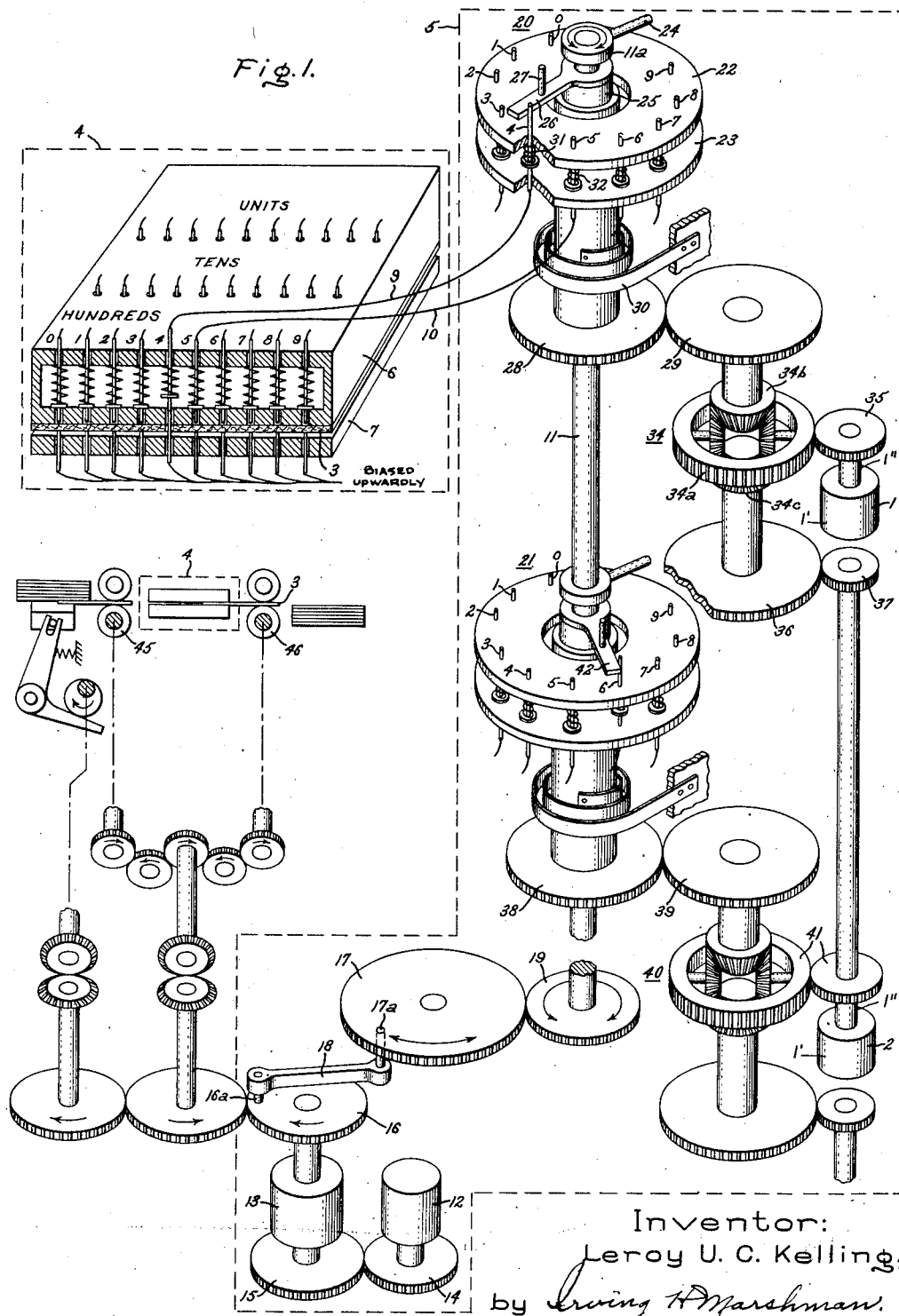

Jan. 14, 1958     L. U. C. KELLING     2,820,186
DIRECTOR POSITIONING SYSTEM
Filed June 9, 1955     2 Sheets-Sheet 1

Inventor:
Leroy U. C. Kelling,
by Irving H. Marshman.
His Attorney.

Jan. 14, 1958    L. U. C. KELLING    2,820,186
DIRECTOR POSITIONING SYSTEM
Filed June 9, 1955    2 Sheets-Sheet 2

Inventor:
Leroy U. C. Kelling,
by Irving H. Marshman,
His Attorney.

# United States Patent Office 2,820,186
Patented Jan. 14, 1958

2,820,186

DIRECTOR POSITIONING SYSTEM

Leroy U. C. Kelling, Waynesboro, Va., assignor to General Electric Company, a corporation of New York Application June 9, 1955, Serial No. 514,138

10 Claims. (Cl. 318—30)

This invention relates to control systems, more particularly to intermittent programming control systems, and it has for an object the provision of a simple, reliable and improved control system of this character.

More specifically, the invention relates to intermittently operating programming control systems in which in response to information recorded on a suitable data storage medium, an object such as a driven element of a machine tool is automatically driven to and stopped in each of plurality of a predetermined positions by means of a follow-up control system of which the follow-up drive motor is controlled by means of an indication of the difference between the actual instantaneous position of such object and its desired position. This indication is obtained by means of a director mechanism and a position indicator. Such director mechanism comprises a plurality of electrical control devices each having relatively movable members for developing control voltages dependent upon the relative positions of the two members. The position indicator comprises a plurality of corresponding or counterpart electrical control devices which are mechanically connected to the driven object so that the positions of their movable members are indicative of the position of such driven object, and a further object of the invention is the provision of means for rapidly and automatically presetting the movable members of the control devices in the director in the precise positions required for positioning the driven object in each of the successive precise locations in which it is to be stopped.

Rotary electrical control devices of the character described in the foregoing may be and preferably are rotary induction devices having a stator member and a rotor member on one of which is mounted a primary winding and on the other of which is mounted a secondary winding. Such control devices are usually referred to by such terms as selsyns, synchros or control transformers.

This invention is an improvement of the means for presetting or prepositioning the movable members of the electrical control devices in the director of the intermittent programming control system which is disclosed in application Serial No. 478,632 filed December 30, 1954 and assigned to the assignee of the present invention. In the system disclosed in application Serial No. 478,632 numerical data is recorded on a suitable data storage medium such as a tabulating card, and a plurality of positioning devices, one for each decimal order of the recorded information are utilized to preposition the movable members of the rotary electrical control devices of the director in positions which correspond to the numerical value of the recorded data. Each of these positioning devices is a combination of electrical and mechanical means. A further object of this invention is the provision of a means for positioning the rotary control devices which is entirely mechanical in its nature and which is simpler and less expensive than the combined electrical and mechanical positioning means of the system disclosed in application Serial No. 478,632.

In carrying the invention into effect in one form thereof, a director is provided which comprises a plurality of rotary electrical control devices, each associated with a different decimal order of the numerical data recorded on a data storage medium together with means for driving their rotor members from an initial position through a succession of angular positions which represent the successive digits of a decimal order. A data storage medium reading device is also provided together with a plurality of digital stop reading assemblies. Each of these assemblies, of which there is one for each decimal order of the recorded digital data, comprises a plurality of equally spaced apart digital stop members each having a retracted position and an advanced position. The data storage medium reading device comprises a plurality of sensing elements which are actuatable to detect digital data in the form of holes in selected digital locations of a data storage medium and to move their corresponding stop members from their retracted to their advanced positions to stop the rotors of the corresponding electrical control devices in positions corresponding to the digital information recorded on the storage medium.

Figure 3:
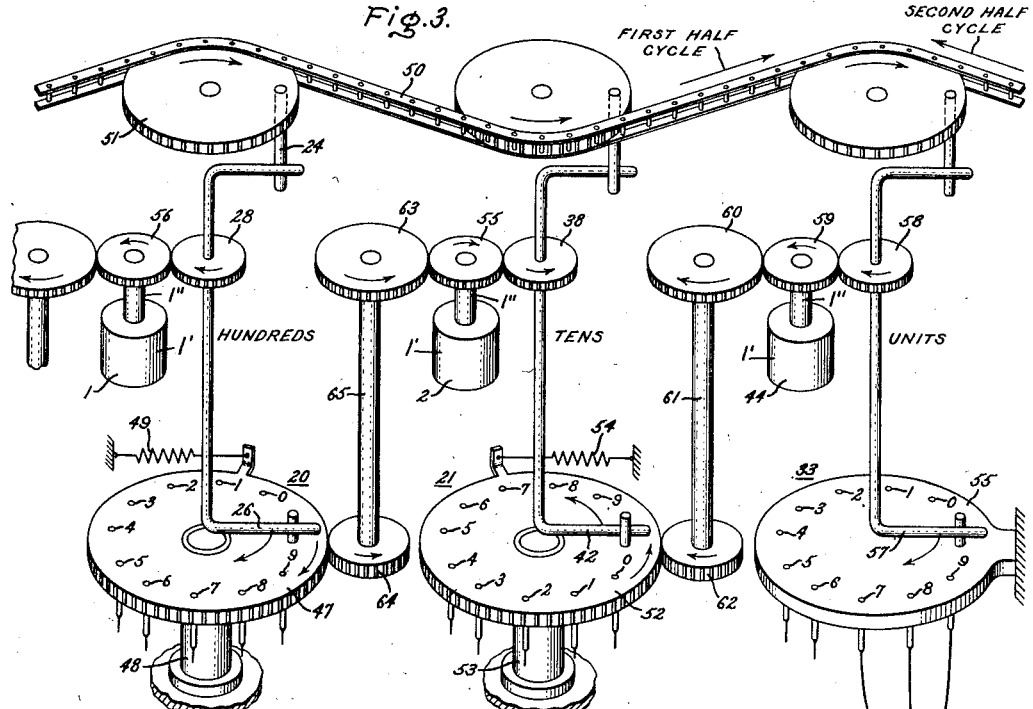
Figure 4:
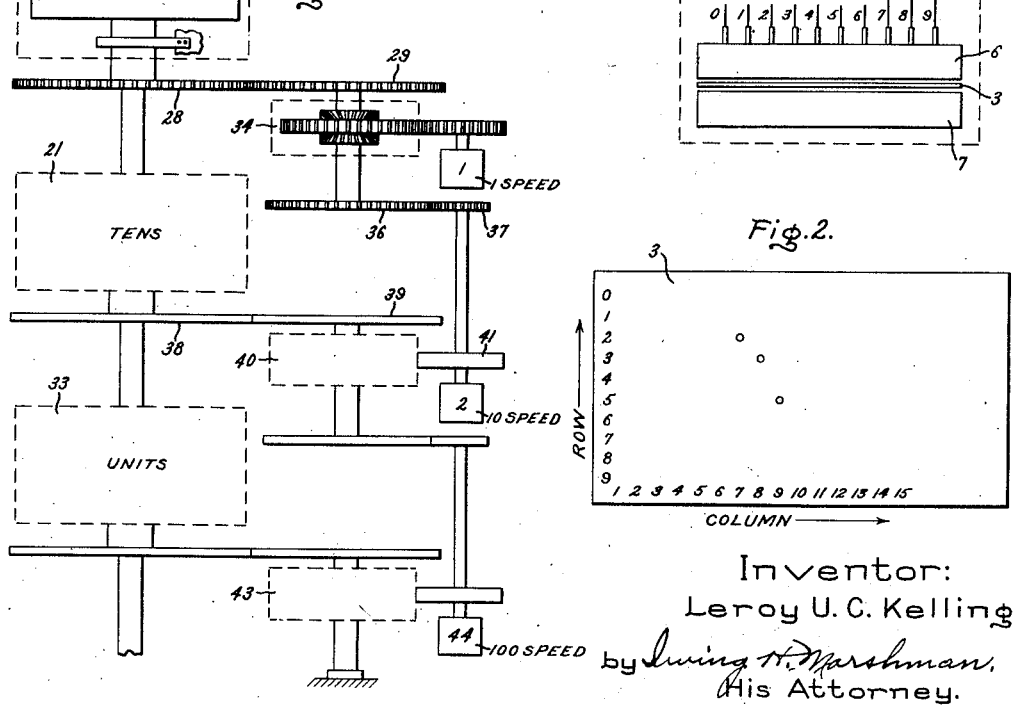
Figure 2:
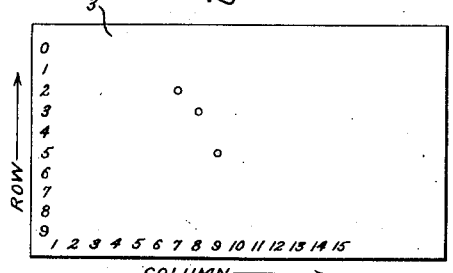

For a better and more complete understanding of the invention, reference should now be had to the following specification and to the accompanying drawings of which Fig. 1 is a simple diagrammatical sketch in perspective of a preferred embodiment of the invention providing means for converting digital information recorded on a numerical data storage medium into corresponding angular positions of the rotors of the rotary electrical devices in the director; Fig. 2 is a diagrammatic representation of a punched tabulating card which may be utilized as such data storage medium; Fig. 3 is a simple diagrammatical sketch of a modification of the positioning means of Fig. 1; Fig. 4 is a diagrammatic view of the digital to analogue converting and summing part of my control system.

Referring now to the drawing, a director mechanism is illustrated as comprising a plurality of rotary electrical control devices 1 and 2. They are illustrated as rotary induction devices of the type of which is usually referred to as a selsyn or a synchro. Such rotary induction device is physically similar to a wound rotor inductor motor in that it has a stator member 1' and a rotor member 1" upon one of which is mounted a primary winding upon the other of which is mounted a secondary winding.

Although only two rotary control devices 1 and 2 are illustrated in the director, a greater or lesser number may be used depending upon the degree of refinement of positioning control that is required of the follow-up control system of which it is a part. In one contemplated application of the invention, an object which may be any movable element of a machine tool is to be moved in succession to a plurality of precise predetermined positions with respect to a reference position which corresponds to the numerical data recorded on a suitable data storage medium, such as the punched tabulating card 3. As shown, this card has a plurality of decimal columns, each having ten digital positions 0–9 inclusive. For each decimal order of the numerical data on the card 3 there is provided in the director a corresponding rotary control device. The rotary control device for the lowest decimal order may be omitted and the rotary control device for the next to lowest decimal order utilized for both the lowest and next to lowest orders. Similarly for each control device in the director, the position indicator (not shown) will have a corresponding control device mechanically coupled to the driven member of the follow-up control system and electrically connected to its counterpart control device in the director. In order that the follow-up control system may be operated to effect movement of the driven member to a predetermined precise position in response to digital information recorded on a data storage medium, means are provided for reading the data recorded on the storage medium and utilizing information obtained therefrom to move the rotor of each rotary control transformer in the director to an angular position which corresponds to the angular position which the rotor of the corresponding control device in the position indicator must occupy when the driven member is in such precise predetermined position.

In Fig. 1 is illustrated diagrammatically a card reader 4 and an assembly 5 for utilizing digital information recorded on the card 3 to move the rotors 1" of rotary control devices 1 and 2 in the director to the identical angular positions which the rotors of the corresponding control transformers in the position indicator will occupy when the driven member is in the position defined by the digital data recorded on the card 3. Because of its function, the assembly 5 is referred to as the rotor positioning assembly. The card reader 4 comprises an upper pinbox 6 and lower pinbox 7, two views of it are illustrated in Fig. 1 in order to show a cross-section through a decimal column of the device and also to show the drive means for feeding cards to the reading chamber and ejecting them therefrom to the stacker. In the lower pinbox 7 is mounted a plurality of columns of pins one column for each decimal column of the card, and also arranged in digital rows of 0 to 9. Likewise in the upper pinbox are mounted an equal number of pins similarly arranged in decimal columns and transverse digital rows and with each pin in register with its counterpart in the lower pinbox. Thus if there is to be recorded on the card 3, digital data of the hundreds, tens and units decimal orders, the pinboxes 6 and 7 will have corresponding hundreds, tens and units decimal columns of pins arranged in digital rows 0 to 9 as indicated in Fig. 1. A card reader suitable for this purpose is shown and described on pages 6 and 7 of "Interfiling Reproducing Punch, Operating Instructions" (SP–TM 2015B) published by Remington Rand.

With the pinboxes is associated the cardfeed and transport mechanism which repeatedly take cards from the feed stack and inserts each in succession into the reading chamber between the upper and lower pinboxes while simultaneously ejecting the previous card from the reading chamber and transporting it to the cardstacker. During the cardreading process, each card is stopped and held in stationary reading position in the reading chamber. Immediately after each card comes to rest in the reading chamber it is probed by a total number of pins equal to the potential number of holes punched in the card and each in the position of a potential hole in the card. These pins probe the card under light spring pressure (provided by individual pin advancing springs (not shown) and through each hole punched in the card passes the corresponding pin of the lower pinbox. Any pins which pass through holes in the card during this probing action are locked by means of a cross slide (not shown) which then advances the pins an additional distance and with a more powerful stroke. The additional advance is preferably of the order of .2" and the magnitude of the force employed is preferably of the order of 2 pounds maximum. Each pin which passes through the hole in the card transmits to the corresponding pin in the upper pinbox the same force, i. e. 2 pounds and advances it the same distance, i. e. 2". The advanced pins in the upper pinbox are similarly locked in their extended positions from the time they are first raised until a new group of pins are raised in response to reading the following card.

The advance of the pins in the upper pinbox may be transmitted to remote locations by suitable means such for example as Bowden pushwires 9 and 10. A Bowden pushwire comprises a hollow flexible tube of relatively small internal diameter, a relatively stiff wire within the tube which readily slides axially through it. If the tube is clamped at both ends, pushing and pulling motions and forces applied at one end are transmitted to the other.

The rotor positioning assembly 5 is illustrated as comprising a rotatably mounted centershaft 11 together with means for oscillating it through forward and return angular excursions, once for each cycle of operation of the controlled machine or one for each tabulating card passing through the card reader. This oscillating means is illustrated as comprising a constant speed motor 12 which is preferably an alternating current induction motor, and a single revolution electromagnetically actuated clutch 13 for coupling the motor to the shaft 11 once for each complete cycle of the controlled machine or once for each card passing through the card reader. As shown, the input or driving member of the clutch is coupled to the motor 12 through a substantial gear reduction comprising meshing gears 14 and 15. The output or driven member of the clutch makes one complete revolution each time the actuated solenoid of the clutch (not shown) is energized. Mounted to the output member of the clutch for rotation therewith is gear 16 which at a point near its periphery is provided with a pin 16a. A gear 17 which is suitably mounted for rotation is provided with a pin 17a which, by means of a linkage 18 is mechanically connected to the pin 16a. Secured to the centershaft 11 is a gear 19 which meshes with gear 17 thereby to impart to the shaft 11 an oscillating motion in response to rotation of gear 16. Preferably the gear ratio of gears 17 and 19 and the linkage 18 is designed to effect a complete excursion, i. e. a forward and return movement of the shaft 11 through an angle of approximately 300° for each complete revolution of the output member of the clutch.

Mounted upon the shaft 11 and spaced from each other by appropriate intervals are a plurality of digital stop reading assemblies, one for each decimal order of the numerical information recorded on the punched tabulating card. In Fig. 1 only two such digital stop reading assemblies 20 and 21 are illustrated and only the assembly 20 or the hundreds decimal order is described in detail since those for the other significant decimal orders are preferably identical. The digital stop reading assembly 20 comprises two spaced-apart disks or plate members 22 and 23 which are fixedly mounted on a suitable supporting frame (not shown). Each is provided with ten holes having digital notations 0 to 9 and each is spaced 30° from its neighbor so that all ten holes occupy 270° of the circumference of the circle in which they are arranged. Corresponding holes in both plates are in register with each other and mounted in these holes are 10 stop pins which also have digital notations 0 to 9. Each digital stop pin in the assembly 20 for the hundreds decimal order is connected by means of a Bowden pushwire to the corresponding digit pin in the hundreds column of the upper pinbox of the card reader 4. For specific example, the digit 4 stop pin in the assembly 20 is connected by means of Bowden pushwire 9 to the digit 4 pin in the upper pinbox, and the digit 5 stop pin is connected by means of Bowden pushwire 10 to the digit 5 pin in the upper pinbox.

Mounted in a hub 11a on the oscillating centershaft 11 is a pin 24 which oscillates with the shaft i. e. with each 300° forward and return excursion of the shaft the pin 24 sweeps through a forward and return excursion of 300°.

A sleevebearing 25 is loosely mounted on the oscillating centershaft 11 for relative rotation with respect thereto. Secured to one end of the sleevebearing is a digit lever 26 and uprightly mounted on this lever is a pin 27 which projects into the path of the oscillating pin 24. To the opposite end of the sleevebearing 25 is secured for rotation therewith a gear 28 which meshes with the gear 29. A torsion spring 30 biases the sleevebearing 25 and with it the digit lever 26 to an extreme position beyond the digit 9 stop pin.

The stop pins in the assembly 20 are biased downward out of the path of digit lever 26. Thus, as shown, the digit 4 and 5 stop pins are biased downward by means of coil springs 31 and 32 respectively.

Following is a brief description of the operation of the hundreds decimal order stop pin reading assembly 20 which may be taken as typical of the operation of the other stop pin reading assemblies of which, it will be remembered, there is one for each significant decimal column of the tabulating card. During the progress of an operating cycle of the machine which is controlled by the follow-up system of which the rotary control devices 1 and 2 constitute the director, the card reader 4 is actuated to retract the advanced digit pins to eject from the reading chamber the tabulating card for the present cycle of the controlled machine and to transport the tabulating card for the next operating cycle of the machine toward the reading chamber in the following manner. At the end of the present cycle of the controlled machine, the single revolution clutch 13 is energized to effect one complete oscillating excursion of the oscillating center shaft 11. During the clockwise portion of such excursion, the oscillating pin 24 engages the upright pin 27 and rotates the digit lever 26 to its extreme clockwise position beyond the zero digit stop pin.

The advanced pins (for the present cycle of operation) in the lower pinbox of the card reader 4 are retracted and the card in the reading chamber is ejected to the stacker. Assuming that the digit 4 pin of the hundreds column is in the advanced position for the present cycle, as illustrated, its return to the retracted position permits the biasing spring 31 in the digital stop reading assembly 20 and the coil spring 31 to return the digit 4 stop pin and the pushpin to their retracted positions.

As the tabulating card for the completed operating cycle of the controlled machine leaves the card reader, its place in the reading chamber is taken by the card for the next operating cycle. Assuming that a hole is punched in the digit 2 position of its hundreds order decimal column, the digit 2 pin in the hundreds column of the lower pinbox will pass through such hole to engage and advance the digit 2 pin in the upper pinbox from its retracted to its advanced position. Owing to the Bowden wire connection between the digit 2 pin in the upper pinbox and the digit 2 stop pin in the assembly 20, the stop pin is advanced into the path of the digit lever 26.

In response to the bias of the spring 30, the pin 27 and the digit lever 26 follow the return or counterclockwise swing of the oscillating pin 24 until the digit lever engages the advanced digit 2 stop pin. The shaft 11 and the oscillating pin 24 complete their return swing while the stop pin holds the digit lever in its digit 2 position.

As previously pointed out, there is a separate digit stop reading assembly for each decimal order of the recorded information, i. e. one for each decimal column of the tabulating card 3 in which digital information is recorded. Assuming that the card 3 has three significant decimal columns as illustrated, there will be in addition to the hundreds decimal order assembly 20 and the tens order assembly 21 illusrtated in Fig. 1 another stop assembly 33 for the units demical order as illustrated conventionally in Fig. 4. In response to the reading of the card 3 in the card reader, the digit lever of each of these digital stop reading assemblies will be stopped in a digital position corresponding to the digit for which a hole is punched in the corresponding column of the card. The operation is the same as that described for the hundreds order assembly 20. From the foregoing it is seen that digital information recorded in the decimal columns of the tabulating card is converted into digital angular positions of a plurality of digit levers of which there is one for each of such columns.

For the purpose of converting such digital angular positions of the digit levers into final analog positions of the rotors 1" of the rotary control devices 1, 2, and 44 suitable differential gearing is provided for mechanically connecting the rotor of each control device in the director to the digit lever of its corresponding digit stop reading assembly and for interconnecting the rotor members of the control devices themselves provide for feeding back to each higher decimal order control device a predetermined fraction of the rotation of the next lower decimal order control device. As shown, a mechanical differential device 34 is provided interconnecting the digit lever 26 of the hundreds decimal order assembly, the one-speed control device 1 and the 10-speed control device 2 of the director. This differential device 34 comprises an output element 34a which is connected through gear 35 to the rotor of the 1-speed control device 1, an input element 34b to which the digit lever 26 is connected through meshing gears 28 and 29 and an input element 34c which is connected through reduction gears 36 and 37 to the rotor of the 10-speed control device 2. The ratio of the gearing 28, 29 is such that with the input member 34c of the differential device restrained, the rotor of the control device 1 rotates 36° for an angular movement of the digit lever equal to the angle between one stop and the next, i. e. 30°. Thus for a hole punched in the digit 2 row of the hundreds column of the card, the rotor of control device 1 will be rotated 72° from an initial position and will be stopped in such 72° position by virtue of the bias of spring 30 holding the digit lever 26 against the advanced digit 2 stop pin.

Similarly, the digit lever 42 of the tens decimal order assembly 21 is connected through gears 38 and 39, mechanical differential device 40 and gearing 41 to the rotor member of the 10-speed rotary control device 2. As shown in Fig. 1 and as conventionally illustrated in Fig. 4, the 10-speed control device 2 is interconnected with the 1-speed device 1 through differential device 34 to the second input member 34c of which it is connected through gears 37 and 36 having a ratio of 1 to 10. The result is that for each 10° of rotation of the control 2, the control device 1 is given an added rotation of 1°. This rotation which is fed back from the control device 2 to the control device 1 is added to the rotation of device 1 from its initial position which was produced by the counterclockwise rotation of the digit lever 26 from its extreme clockwise position. The ratio of the gearing 38, 39 and 41 is the same as that of gearing 28, 29 and 35, i. e. it is such that for each 1-stop rotation of the digit lever 42, the rotor of the control device 2 rotates 36°. Thus, for a hole punched in the digit 3 row of the tens column of the tabulating card, control device 2 is rotated 108° from an initial position and by virtue of the 1 to 10 ratio feedback connection through gearing 37, 36 and differential device 34, a rotation of 10.8° is added to the 72° previous rotation of the 1-speed control device 1 which is produced by the hundreds order digit reading assembly 20 in response to the hole in the digit 2 row in the hundreds decimal order column of the card 3.

For the remaining digital stop reading assembly 33, a corresponding mechanical differential device 43 is provided as illustrated conventionally in Fig. 4. One of its output members is locked, as shown, and it is equivalent to a direct gearing of the same ratio. This differential device connects the digit stop reading assembly 33 with the 100-speed control device 44 and the differential device 40 provides a feedback connection between the 100-speed control device and the 10-speed control device 2. Similarly, the ratio of the gearing transmission in this feedback connection is 1 to 10.

From the foregoing it is seen that in response to the passage of a tabulating card through the card reader, the digit lever of each of the digit stop reading assemblies is rotated from its initial or extreme clockwise position a number of stops which corresponds to the numerical value of the digital row in which a hole is punched in the corresponding decimal column of the card 3. Also, each of the rotary control devices 1, 2 and 44 is, during the clockwise rotation of the digit lever to which it is connected, rotated to an extreme clockwise position. Finally, it is seen that during the counterclockwise rotation of each such digit lever, its associated control device is rotated to a position which is displaced from an initial position by a number of degrees which is equal to 36° times the number of stops rotation of the digit lever plus one-tenth the total rotation of the control device of the next lower decimal order.

In order that the operation of the card reader may be properly synchronized with the operations of the digits stop reading assemblies 20, 21 and 33, the card reader is preferably driven from the output member of the single revolution clutch 13. As shown, the transport rolls 45 and 46 of the card reader are interconnected with each other and with the card feed knife by suitable gearing and are driven by means of a direct mechanical driving connection to the output shaft of the single revolution clutch 13 from which the oscillating centershaft 11 of the entire rotor positioning assembly is driven as described in the foregoing.

With the foregoing understanding of the elements and their organization, the operation of the positioning system will readily be understood from the following description in which it is assumed that the driven member of the follow-up control system of which the control transformers 1, 2 and 44 constitute the director, is to be driven to and stopped in a position which is a predetermined distance, e. g., 235" from an initial position. It is assumed that the 100-speed control device of the position indicator is geared to the driven member of the controlled machine through gearings which causes it to make one complete revolution for each 10" movement of the driven object. Consequently, it will make 23½ complete rotations for the 235" movement of the driven object. In other words, when the driven object is 235" from an initial position, the rotor of the 100-speed control device of the position indicator will be in an angular position 180° from its initial position. By similar calculation, the rotors of the 10-speed and the 1-speed control devices of the position indicator will be in angular positions of 126° and 84.6° respectively from their initial positions. Consequently in order that the follow-up control system shall operate to stop the driven object when the 100-speed, 10-speed and 1-speed control devices of the position indicator are simultaneously in the positions of 180°, 126° and 84.6° respectively the rotors of the 100-speed control device 44, the 10-speed control device 2 and the 1-speed control device 1 of the director must be preset in corresponding angular positions of 180°, 126° and 84.6° respectively in response to the passage through the card reader of a tabulating card having recorded thereon digital information corresponding to the number 235. Such information is in the form of a hole punched in the digit 2 row of the hundreds column, another hole in the digit 3 row of the tens column and still another hole in the digit 5 row of the units column.

During the clockwise portion of an oscillation or the centershaft 11, the oscillating pins which are secured to the shaft engage the upright pins on the digit levers of the digit stop reading assemblies and rotate them to their extreme clockwise positions. Owing to their gear connections with the digit levers, the rotors of the control devices 1, 2 and 44 are rotated to their extreme clockwise positions. Also during this clockwise portion of the centershaft oscillation, the tabulating card in the reading chamber of the card reader for the immediately preceding completed cycle of operation of the control machine is ejected to the stacker, and the card for the next operation is fed from the feeding stack into the chamber. It reaches the reading position just prior to the arrival of the digit levers of the stop reading assemblies at their extreme clockwise positions. In the reading position, the card is probed by the pins of the lower pinbox 7. The digit 2 of the hundreds decimal order column passes through the digit 2 hole of the hundreds decimal order column of the card. Similarly, the digit 3 pin of the tens order and the digit 5 pin of the units order pass through the digit 3 hole of the tens column and the digit 5 hole of the units column respectively. In response to the passage of the digit 2 pin through the hole in the hundreds column, the digit 2 stops in the hundreds decimal order stop reading assembly 20 is, by means of its Bowden wire connection 9, moved from its retracted position to its advanced position in the path of the return or counter clockwise movement of the digit lever 26. Similarly, the digit 3 stop pin in the tens order decimal order assembly 21 and the digit 5 stop pin in the units decimal order assembly are advanced from their retracted positions into the path of the counter clockwise movements of the digit levers of the tens and units stop reading assemblies 20 and 33 respectively.

The counter clockwise movement of the digit lever of the units order stop assembly is stopped by the digit 5 stop pin and consequently the rotor member of the control device 44 of the units order which is driven in synchronism with the digit lever is stopped in an angular position equal to the product of digit 5 and 36° or 180° from its initial reference position. It will be remembered that the rotor rotates 36° for the movement of the digit lever from one digital position to the next. By virtue of the feedbacks previously described the 180° rotation of the rotor of the units order control device 44 produces 18° rotation of the rotor of the tens order of control transformer 2 and 1.8° rotation of the rotor of the control device 1 of the hundreds decimal order.

Similarly, the digit lever of the tens decimal order stop reading assembly 21 is stopped in the digit 3 position to produce 3 times 36° or 108° rotation of the rotor or the tens order of the control device 2 for a total of 126° i. e. 108° plus 18° produced by the feedback from the units order control device. By virtue of the differential feedback connection to the hundreds order control transformer, the 108° rotation of the tens order control transformer produces 10.8° additional rotation of the control device 1 of the hundreds order. Likewise the digit lever 26 of the hundreds order assembly is stopped in the digit 2 position and the rotor of the hundreds order control device is rotated 2 times 36° or 72° plus a 1.8° and 10.8° rotation produced by the feedbacks from the units order and the tens order control devices for a total of 84.6°. Thus the rotors of the 100-speed control device 44 the 10-speed control device 2 and the 1-speed control device 1 of the director are preset in angular positions of 180°, 126°, and 84.6° respectively to correspond to the angular positions which the rotors of the corresponding control devices of the position indicator occupy when the driven member of the follow-up control system is precisely 235" from the predetermined initial position.

The differential devices 34, 40 and 43 of the modification illustrated in Figs. 1 and 4 may be eliminated and the feedbacks from each lower decimal order control device to the next higher order control device may be obtained by means of the construction illustrated in Fig. 3. In the Fig. 3 modification, the control transformers 1, 2 and 44 for the hundreds, tens and units decimal order correspond to the control transformers 1, 2 and 44 respectively of the Fig. 1 modification. Each of the stop reading assemblies 20, 21 and 33 for the hundreds, tens and units decimal orders has a disk which corresponds to the top plate 22 of the stop reading assembly in the Fig. 1 modification. In this connection, the hundreds decimal order stop reading assembly 20 has a disk 47 which corresponds to the fixedly mounted plate 22 of the assembly 20 of the Fig. 1 modification. It is provided with holes which are separated from each other by 30° and which bear digital notations 0 to 9. The disk 47 is mounted for rotation on a fixed bearing post 48 in contrast to the fixed mounting of the stop mounting plates 22 and 23 in Fig. 1 modification. A spring 49 biases the rotatably mounted disk 47 to an initial position in which it is illustrated in Fig. 3.

For the purpose of causing the digit lever 26 to oscillate through an excursion of clockwise and counter clockwise movement each time a tabulating card is fed through the reader 4, an oscillating roller drive chain 50 is provided. Preferably, this chain is driven from the shaft of the oscillating disk 17 of Fig. 1 which drives the oscillating centershaft 11 of that modification. The digit stop reading assembly 20 is provided with a sprocket wheel 51 which is oscillated through an angle of 300° of clockwise and counter clockwise movement once for each oscillation of the disk 17 and consequently once each time a tabulating card is fed to the card reader. It is assumed that during the first half of the oscillation the chain moves from left to right and during the second half from right to left as indicated by arrows and appropriate legends in Fig. 3. The digit lever 26 is biased by means of the spring 30 to an extreme counter clockwise position against a stop.

As in the Fig. 1 modification, the stop reading assembly for each decimal order is provided with normally retracted stop pins having digital notations 0 to 9. Each stop is connected by means of a Bowden pushwire to the corresponding pushpin in the upper pinbox 6 in the tabulating card reader 4 as exemplified by the Bowden wires between the digit 7, 8 and 9 pushpins of the units decimal order and the digit 7, 8 and 9 stop pins. All of the digital stop pin supporting disks with the exception of the disk for the lowest decimal order are mounted for rotation. Thus, like the disk 47 of the hundreds decimal order assembly, the disk 52 of the tens order is rotatably mounted on a fixed bearing post 53 and is biased by means of a spring 54 to an extreme clockwise position against the stop. However, the digital stop supporting disk 55 for the units decimal order is fixedly mounted as shown.

The rotor of the hundreds decimal order control device 1 is connected through gears 28 and 56 to the digit lever 26 so as to be driven therewith through the same counter-clockwise and clockwise angular excursion. No mechanical differential device is connected between gear 28 and the rotor of the control transformer 1 or between such rotor and the rotor of the control device 2. Similarly, no mechanical differential device is provided for the digit stop reading assemblies 21 and 33.

In order to provide the necessary feedback to the rotor of each control device from the rotor of the control device of the next lower decimal order, a direct gearing connection is provided from the control device of the lower decimal order to the digit stop supporting disk of the next higher decimal order. Thus the rotor member of the units decimal order control device 44 is driven by its digit lever 57 through meshing gears 58 and 59. From the gear 59 on the rotor shaft of control device 44 a feedback connection to the stop supporting disk 52 of the tens assembly 21 is provided by means of gear 60, shaft 61 and gear 62. The ratio of the gearing between the stop supporting disk 52 and the rotor of control device 44 is 1 to 10, i. e. the disk 52 rotates 1° for each 10° rotation of the rotor of control device 44. Similarly, a 1 to 10 reduction gearing comprising gears 63 and 64 and a connecting shaft 65 is provided between the rotor of control device 2 and the stop supporting disk 47 of the hundreds assembly 20. As a result of this connection, the disk 47 is rotated 1° for each 10° rotation of the rotor of control device 2.

The operation of this modification is similar to the operation of the system of Fig. 1. This is illustrated by assuming that the same numerical information i. e. the number 235 is recorded on the tabulating card 3 which is illustrated in reading position in the card reader 4 of Fig. 3. Responsively to the reading operation of the card, the digit levers 26, 42 and 57 are oscillated to extreme positions and then come to rest against the advanced digit 2, digit 3 and digit 5 stop pins of the hundreds, tens and units stop reading assemblies in the manner explained in the description of the operation of the system of Fig. 1. As a result, the rotors of the control devices 44, 2 and 1 are rotated 180°, 108° and 72° respectively from their initial positions. The 180° rotation of the rotor of the units order control device 44 produces through the feedback connection a rotation of 18° of the stop supporting disk 52 of the tens order assembly which permits the spring 66 to rotate the rotor of the control device 2 an additional 18° for a total of 126°. In like manner, by virtue of the feedback connection from the tens order control device 2 to hundreds order control transformer 1, the total rotation of 126° of the rotor of control device 2 produces an additional rotation of 12.6° of the control device 1 for a total rotation of 84.6° from an initial position. The modification of Fig. 4 has the advantage over the modification of Fig. 1 of greater gear accuracy and very substantially lower cost.

Although in accordance with the provisions of the patent statutes, this invention is described as embodied in concrete form and the principle thereof has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. In combination, a director means comprising a rotary electrical device having a rotor member and a stator member, means for driving said rotor member from an initial position through a succession of positions corresponding to the digits of a decimal order, and means for stopping said rotor member in a position corresponding to the numerical value of digital data recorded on a digital data storage medium comprising a plurality of spaced-apart stop members each having a retracted position and an advanced position, and a digital storage medium reading device having a plurality of sensing elements each actuatable to detect digital indicia on a data storage medium and to move a corresponding one of said stop members from its retracted to its advanced position to stop said rotor in an angular position corresponding to the numerical value of the digital data recorded on said medium.

2. In combination, a director means comprising a rotary electrical device having a rotor member and a stator member, means for driving said rotor member from an initial position through a succession of positions corresponding to the digits of a decimal order, and means for stopping said rotor member in a position corresponding to the numerical value of a digit represented by the position in a decimal column of a hole through a data storage medium comprising a plurality of equally spaced-apart stop members each having a retracted position and an advanced position and a digital storage medium reading device having a plurality of sensing elements each movable through a corresponding one of said holes in a decimal column of said data storage medium to move a corresponding one of said stop members from its retracted position to stop said rotor in an angular position corresponding to the numerical value of the digital data recorded on said medium.

3. In combination, a data storage medium reader having a plurality of sensing elements actuatable to detect digital indicia in the form of holes in a data storage medium, a disk member provided with a plurality of equally spaced-apart stop members each having a retracted position and an extended position and each corresponding to a different digit, a rotary electrical device having a rotor member and a stator member, driving means having a driving member oscillatable through a range of forward and reverse movements and connected to said rotor member to position it in an initial position with respect to its stator member in response to said forward movement, and means responsive to actuation of one of said sensing elements for advancing a corresponding stop member from its retracted position to its extended position to interrupt the driving connection between said driving member and said rotor to stop said rotor in an angular position corresponding to the numerical value represented by said actuated sensing element.

4. In combination, a data storage medium reader having a plurality of sensing elements actuatable to detect digital indicia recorded in the form of holes in a data storage medium, a disc member provided with a plurality of equally spaced-apart circumferentially disposed stop members each having a retracted position and an extended position and each corresponding to a different digit, a rotary electrical device having a rotor member and a stator member, driving means for said rotor member having a driving member oscillatable through a range of forward and reverse movements for rotating said rotor member to a predetermined initial position with respect to its stator member in response to said forward movement, spring means for biasing said rotor member for rotation in the reverse direction in response to said reverse movement of said driving member, and means responsive to actuation of one of said sensing elements for advancing a corresponding stop member to its extended position to interrupt the driving connection between said driving member and said rotor to stop said rotor in an angular position corresponding to the numerical value represented by said actuated sensing element.

5. In combination, a data storage medium reader having a plurality of sensing elements actuatable to detect digital indicia recorded in the form of holes in a data storage medium, a disc member provided with a plurality of equally spaced-apart circumferentially disposed stop members each having a retracted position and an extended position and each corresponding to a different digit, a rotary electrical device having a rotor member and a stator member, driving means for said rotor member having a driving member oscillatable through a range of forward and reverse movements and a driven member mechanically coupled to said rotor member and disposed in the path of the forward movement of said driving member to effect rotation of said rotor member to a predetermined initial position with respect to its stator member, spring means for biasing said driven member for rotation in the reverse direction in response to said reverse movement of said driving member, and means responsive to actuation of one of said sensing elements for advancing a corresponding stop member to its extended position to terminate said reverse movement of said driven member with said rotor in an angular position corresponding to the numerical value represented by said actuated sensing element.

6. In combination, a data storage medium reader having a plurality of sensing elements actuatable to detect digital indicia in the form of holes in a data storage medium, a supporting member provided with a plurality of equally spaced-apart and circularly disposed stop members each having a retracted position and an advanced position and each corresponding to a different digit, a rotary electrical device having a rotor member and a stator member, driving means for said rotor member having a driving member oscillatable through a range of forward and reverse movements for rotating said rotor member to a predetermined initial position with respect to its stator member in response to said forward movement, spring means for biasing said rotor member to follow the reverse rotation of said driving member, and means responsive to actuation of each of said sensing element for moving its corresponding stop member to its extended position to stop said rotor in an angular position corresponding to the numerical value represented by the actuated sensing element comprising a cable connection between each of said sensing elements and its corresponding stop member having a relatively flexible tubular sheath and a relatively stiff axially movable push wire within said sheath.

7. In combination, a data storage medium reader for detecting digital indicia in the form of holes in selected locations a data storage medium having a plurality of sensing pins and means for actuating said pins to pass through said holes, a support member provided with a plurality of equally spaced-apart circumferentially disposed stop pins each corresponding to a different digit spring means biasing each of said stop pins to a retracted position, a rotary electrical device having a rotor member and a stator member, driving means for said rotor member having a driving member oscillatable through a range of forward and reverse movements and a driven member mechanically coupled to said rotor and disposed in the path of the forward movement of said driving member to effect rotation of said rotor member to a predetermined initial position with respect to its stator member spring means for biasing said driven member into engagement with said driving member to cause said driven member to follow the reverse movement of said driving member and means responsive to actuation of each of said sensing pins for advancing a corresponding one of said stop pins into the path of return movement of said driven member to stop said rotor in an angular position corresponding to the numerical value represented by said actuated sensing pin comprising a Bowden cable connection between each sensing pin and its corresponding stop pin.

8. In combination, a numerical data storage medium reading device having a plurality of sensing elements actuatable to detect digital indicia in the form of holes in selected locations in a data storage medium, a plurality of support members one for each decimal order of the numerical data stored in said medium and each provided with a plurality of equally spaced-apart stop members disposed in a circle and each corresponding to a different digit, a director comprising a plurality of rotary electrical devices each having a rotor member and a stator member and each corresponding to a different decimal order, driving means for said rotor members, means responsive to actuation of said sensing elements for moving said stops from retracted positions to advanced positions to stop said rotor members in positions corresponding to the numerical values associated with the actuated sensing elements and a mechanical driving connection between each of said rotor members and the support member of the next higher decimal order for rotating each supporting member through an angle having a predetermined ratio to the angular rotation of the rotor member associated with the next lower decimal order.

9. In combination, a numerical data storage medium reader having a plurality of sensing elements actuatable to detect digital indicia in the form of holes in selected locations in a data storage medium, a plurality of support members, one for each decimal order of the numerical data stored in said medium and each provided with a plurality of equally spaced-apart and circumferentially disposed stop members, one for each digit, means fixedly mounting the support member corresponding to the lowest of said decimal orders, means rotatably mounting the remainder of said support members, a plurality of rotary electrical devices, one for each of said decimal orders, and each having a rotor member and a stator member, driving means for said rotor members, means responsive to actuation of said sensing elements for moving said stops from retracted positions to advanced positions for stopping each of said rotor members in angular positions corresponding to the numerical values represented by the actuated sensing elements of the corresponding decimal orders, and a mechanical driving connection having a 1 to 10 ratio between each of said rotor members and the support associated with the next higher decimal order for rotating each rotor member an additional amount equal to one tenth the angular rotation of the rotor member of the next lower decimal order.

10. In combination, a numerical data storage medium reader having a plurality of successive decimal order groups of sensing elements actuatable to detect digital indicia in the form of holes in said data storage medium, a plurality of support members, one for each decimal order of the numerical data stored in said medium and each provided with a plurality of equally spaced-apart and circumferentially disposed stop members, one for each digit of the associated decimal order, means fixedly mounting the support member corresponding to the lowest of said decimal orders, means mounting the remainder of said support members for rotation, a plurality of rotary electrical devices, each associated with a different one of said decimal orders and each having a rotor member and a stator member, driving means for said rotor members comprising a separate driving member for each of said rotors and means for simultaneously oscillating said driving members through a range of forward and reverse movements and a separate driven member for each of said rotors mechanically coupled thereto and disposed in the path of the forward movement of said driving members to effect rotation of said rotor members to predetermined initial positions with respect to their stator members, spring means for biasing said driven members to follow the reverse movements of said driving members, and means responsive to actuation of said sensing elements for moving their corresponding stop members to advanced positions to stop the associated rotor members in angular positions corresponding to the numerical values represented by the actuated sensing elements comprising a Bowden cable connection between each sensing element and its corresponding stop member and a mechanical driving connection between each of said rotor members and the support member of the next higher decimal order for rotating each supporting member an additional angle having a predetermined ratio to the angular rotation of the rotor member associated with the next lower decimal order.

References Cited in the file of this patent

UNITED STATES PATENTS 2,715,703  Schuck _____ Aug. 16, 1955